UNITED STATES PATENT OFFICE.

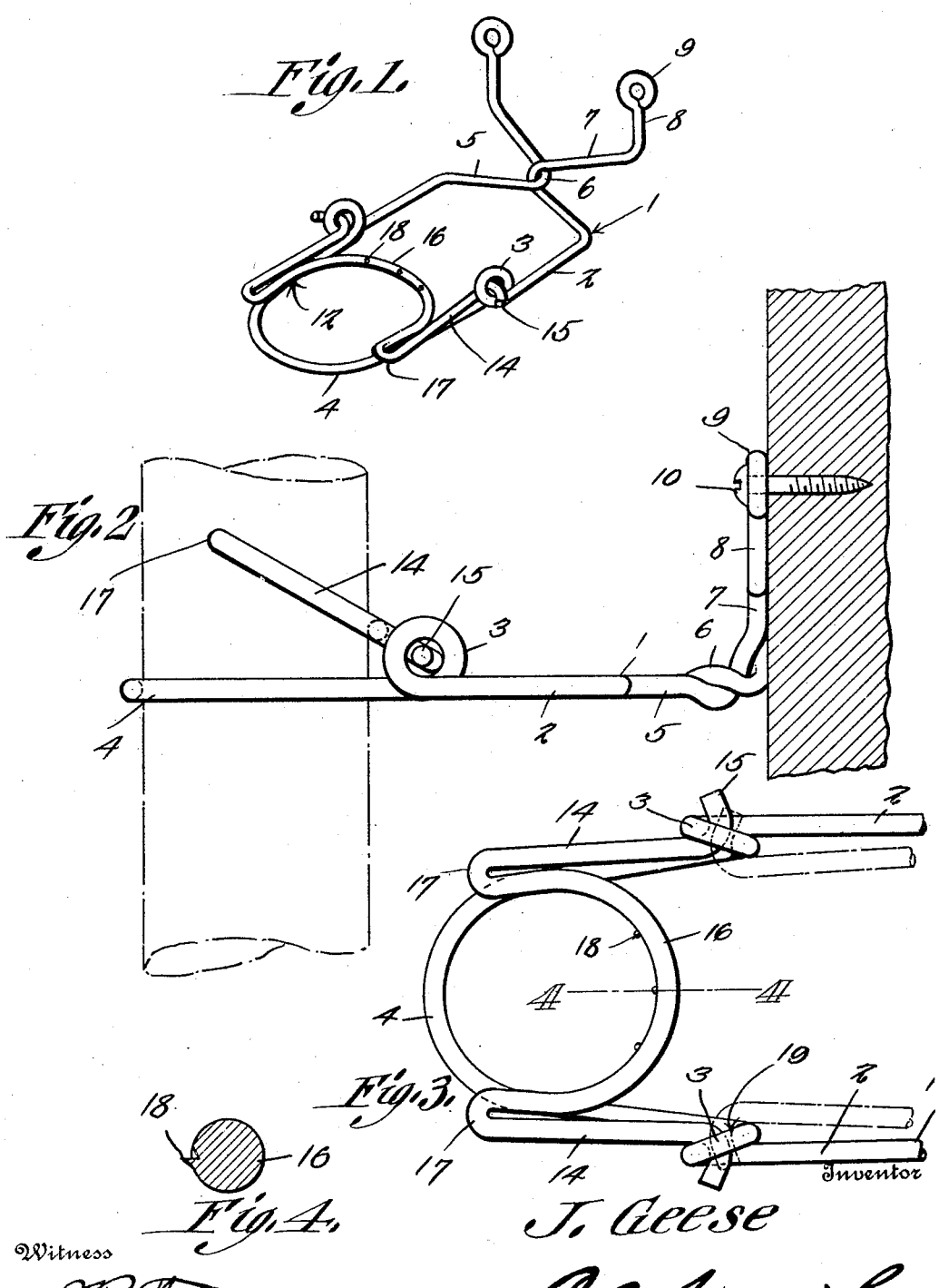

JEREMIAH GEESE, OF ABERDEEN, MARYLAND.

BROOM HOLDER.

1,407,025.  Specification of Letters Patent.  Patented Feb. 21, 1922.

Application filed September 23, 1919. Serial No. 325,725.

*To all whom it may concern:*

Be it known that I, JEREMIAH GEESE, a citizen of the United States, residing at Aberdeen, in the county of Harford and State of Maryland, have invented a new and useful Broom Holder, of which the following is a specification.

It is the object of this invention to provide novel means for suspending a broom, rake, hoe, or other implement having a handle.

The invention aims to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, changes in the precise embodiment of the invention herein disclosed, may be made within the scope of what is claimed without departing from the spirit of the invention.

In the accompanying drawings:—

Figure 1 shows in perspective, a device constructed in accordance with the invention; Figure 2 is a side elevation wherein the structure is shown assembled with a support; Figure 3 is a top plan wherein parts are broken away; and Figure 4 is a section taken approximately on the line 4—4 of Figure 3.

The device forming the subject matter of this application preferably is made of wire throughout and includes a main member 1 comprising approximately parallel arms twisted intermediate their ends to form upstanding eyes 3. The outer ends of the arms 2 are connected by a convexed jaw 4. The rear ends of the arms 2 of the main member 1 are inwardly extended, as shown at 5, and are twisted together, as shown at 6, the piece of wire out of which the member 1 is made being prolonged, beyond the twisted portion 6, to fashion lateral extensions 7 terminating in upstanding fingers 8 having eyes 9 adapted to be connected, by means of screws 10 or otherwise, to a wall or support. Any desired means may be provided, however, for attaching the main member 1 to the support 11.

The invention includes an auxiliary member 12 comprising approximately parallel arms 14 provided at their rear ends with hooks 15 pivoted in the eyes 3 of the arms 2 of the main member 1. At their forward ends, the arms 14 of the auxiliary member 12 are connected by bends 17 with a concaved jaw 16 adapted to cooperate with the convexed jaw 14 of the main member 1 in gripping a broom handle or like object. If desired projections 18 may be struck from the jaw 16 to aid in gripping the broom handle.

The auxiliary member 12 is located above the main member 1, the bends 17 of the auxiliary member formerly resting on the jaw 4 of the main member, as shown in Figure 1. If a broom handle is thrust upwardly within the contour of the jaw 4, the auxiliary member 12 will be swung upwardly, and the weight of the broom or other object will cause the handle thereof to be gripped firmly between the jaws 4 and 16.

A salient and important feature of the invention remains yet to be discussed. Noting Figure 3 of the drawings it will be seen that, as indicated at 19 the inner surfaces of the eyes 3 of the main member 1 slant inwardly and rearwardly. The arms 14 of the auxiliary member 12 ride along the slanting surfaces 19 of the eyes 3, when the auxiliary member is swung upwardly on its pivotal mounting 3—15. Since the arms 14 of the auxiliary member 12 possess some resiliency, they will be pressed toward each other, when the auxiliary member 12 is swung backwardly, as aforesaid, this operation being indicated in dotted line in Figure 3. As soon as the auxiliary member 12 is released, having been swung upwardly, the arms 14 cooperate with the slanting surfaces 19 of the eyes 3 of the main member 1, this cooperation of parts tending to swing the auxiliary member 12 downwardly toward the position indicated in Figure 1, the handle of the broom or other object being gripped securely between the parts 16 and 4.

Having thus described the invention, what is claimed is:—

In a device of the class described, a main member comprising arms united at their forward ends by a convexed jaw, the rear ends of the arms being extended inwardly and being twisted together, the arms being prolonged beyond the point of twisting, and being spaced, and extended upwardly and terminating in support-engaging elements, the arms being bent upon themselves, intermediate their ends, to form upstanding eyes; and an auxiliary member comprising arms provided at their rear ends with elements pivotally engaged with the eyes, the forward ends of the arms of the auxiliary member being united by a concaved jaw cooperating with the convexed jaw of the main member, the auxiliary member being supported on the main member.

In testimony that I claim the foregoing as my own, I have hereto affixed my signature in the presence of two witnesses.

JEREMIAH GEESE.

Witnesses:
A. N. MITCHELL,
W. H. PUFFLE.